US008407675B1

(12) United States Patent
Clark

(10) Patent No.: US 8,407,675 B1
(45) Date of Patent: Mar. 26, 2013

(54) EXTRACTION OF EXECUTABLE CODE AND TRANSLATION TO ALTERNATE PLATFORM

(75) Inventor: Barton T. Clark, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1409 days.

(21) Appl. No.: 12/075,289

(22) Filed: Feb. 5, 2008

Related U.S. Application Data

(60) Provisional application No. 60/900,306, filed on Feb. 6, 2007.

(51) Int. Cl.
*G06F 9/45* (2006.01)

(52) U.S. Cl. ........ 717/131; 717/132; 717/137; 717/138; 717/151; 717/154

(58) Field of Classification Search .................. None
See application file for complete search history.

(56) References Cited

U.S. PATENT DOCUMENTS

| | | | | |
|---|---|---|---|---|
| 4,931,928 A * | 6/1990 | Greenfeld | ...................... | 717/131 |
| 5,005,152 A | 4/1991 | Knutsen | ........................ | 364/900 |
| 5,551,015 A * | 8/1996 | Goettelmann et al. | ........ | 717/137 |
| 5,724,590 A * | 3/1998 | Goettelmann et al. | ........ | 717/154 |
| 5,881,290 A | 3/1999 | Ansari et al. | ................... | 395/705 |
| 6,151,701 A * | 11/2000 | Humphreys et al. | .......... | 717/130 |
| 6,289,505 B1 * | 9/2001 | Goebel | ......................... | 717/153 |
| 6,425,118 B1 * | 7/2002 | Molloy et al. | ................. | 717/136 |
| 6,631,514 B1 * | 10/2003 | Le | .................................. | 717/137 |
| 6,795,908 B1 * | 9/2004 | Lee et al. | ....................... | 717/160 |
| 7,051,322 B2 * | 5/2006 | Rioux | ............................ | 717/141 |
| 7,516,453 B1 * | 4/2009 | Bugnion | ....................... | 717/138 |
| 7,543,284 B2 * | 6/2009 | Bolton et al. | ................. | 717/157 |
| 7,594,221 B2 * | 9/2009 | Bhushan et al. | ............... | 717/136 |
| 7,739,516 B2 * | 6/2010 | Brender et al. | ................ | 713/193 |
| 7,765,539 B1 * | 7/2010 | Elliott et al. | .................... | 717/168 |
| 2001/0013118 A1 * | 8/2001 | Krishnaswamy | .................. | 717/5 |
| 2003/0018608 A1 * | 1/2003 | Rice et al. | .......................... | 707/1 |
| 2003/0163691 A1 * | 8/2003 | Johnson | ......................... | 713/168 |
| 2005/0010891 A1 * | 1/2005 | Chaiken et al. | ............... | 717/100 |
| 2005/0235271 A1 * | 10/2005 | Sanyal et al. | .................. | 717/136 |
| 2006/0085179 A1 * | 4/2006 | Hack et al. | ..................... | 717/138 |

(Continued)

OTHER PUBLICATIONS

Gaurav Mittal et al., Automatic Translation of Software Binaries onto FPGAs, Copyright 2004 ACM 1-58113-828-04/04/0006, [Retreived on Nov. 28, 2011]. Retrieved from the internet: <URL: http://users.eecs.northwestern.edu/~mittal/papers/p25-1-mittal.pdf> pp. 1-6.*

(Continued)

*Primary Examiner* — Don Wong
*Assistant Examiner* — Anibal Rivera
(74) *Attorney, Agent, or Firm* — Gerhard W. Thielman, Esq.

(57) ABSTRACT

A technique for transferring binary instructions from a computer system to an external platform is described herein. The process extracts binary instructions from the computer system. The instructions include a function at a register location. The process disassembles the binary instructions to produce an intermediate representation of the function. An interruption is inserted at the register location linked to a routine call. The process analyzes the intermediate representation for data dependency to identify internal data references for the routine call and external data references to produce a data dependence representation. The process reconfigures the data dependence representation to produce a reconfigured representation, whose control flow logic produces a logic hierarchy representation for the function. The process then translates the logic hierarchy representation to produce a source code of the function that compiles on the external platform to produce an object code to be linked with the binary code upon execution.

6 Claims, 15 Drawing Sheets

U.S. PATENT DOCUMENTS

2006/0277532 A1* 12/2006 Barraclough et al. ........ 717/137
2007/0079304 A1*  4/2007 Zheng et al. .................. 717/151
2008/0127078 A1*  5/2008 Nam et al. .................... 717/120

OTHER PUBLICATIONS

Jan Gray et al., Building a RISC CPU and System-on-a-Chip in an FPGA,1999, [Retreived on Nov. 28, 2011]. Retrieved from the internet: <URL: http://www.fpgacpu.org/papers/xsoc-series-drafts.pdf> pp. 1-25.*

S. Praveen et al., Array Data Transformation for Source Code Obfuscation, 2007, [Retreived on Nov. 28, 2011]. Retrieved from the internet: <URL: http://www.waset.org/journals/waset/v36/v36-16.pdf> pp. 83-87 Total pages 5.*

Greg Stitt et al., Binary-Level Hardware/Software Partitioning of MediaBench, NetBench, and EEMBC Benchmarks, Jan. 2003, [Retreived on Nov. 28, 2011]. Retrieved from the internet: <URL: http://alumni.cs.ucr.edu/~gstitt/publications/gstitt_hwsw_tr.pdf> pp. 1-8.*

Marc Angelone et al., Approaches for Universal Static Blnary Translation, Mar. 2006, [Retreived on Nov. 28, 2011]. Retrieved from the internet: <URL: https://www.cs.drexel.edu/files/ts467/DU-CS-06-02.pdf> pp. 1-67.*

Thomas Reps et al., Intermediate-Representation Recovery from Low-Level Code, 2006 ACM 1-59593-196-1, [Retrieved on Nov. 16, 2012]. Retrieved from the internet: <URL: http://dl.acm.org/citation.cfm?id=1111560> 12 Pages (100-111).*

Michael Franz, Adaptive Compression of Syntax Trees and Iterative Dynamic Code Optimization: Two Basic Technologies for Mobile Object Systems, 1997, Vo. 1222, [Retrieved on Nov. 16, 2012]. Retrieved from the internet: <URL: http://www.springerlink.com/content/p17815660876m2t4/fulltext.pdf> 14 Pages (263-276).*

S. Praveen et al., "JDATATRANS for Array Obfuscation in Java Source Code to Defeat reverse Engineering from Decompiled Codes", ACM Compute 2009 Conference. http://arxiv.org/ftp/arxiv/papers/0809/0809.3503.pdf.

* cited by examiner

| | | | | | | | | | | |
|---|---|---|---|---|---|---|---|---|---|---|
| .text:080482A0 | 50 | E8 | 00 | 00 | 00 | 00 | 5B | 81 | C3 | B2 | 12 | 00 | 00 | 8B | 83 | 14 |
| .text:080482B0 | 00 | 00 | 00 | 85 | C0 | 74 | 02 | FF | D0 | 8B | 5D | 04 | 08 | C9 | 90 | 90 |
| .text:080482C0 | 55 | 89 | E5 | 83 | EC | 08 | 8B | 3D | 85 | 70 | 95 | 17 | 89 | 04 | 08 | 75 | 29 | A1 |
| .text:080482D0 | 68 | 94 | 04 | 08 | 08 | 8B | 10 | 85 | D2 | 74 | 17 | 04 | 08 | 83 | C0 | 04 | A3 |
| .text:080482E0 | 68 | 94 | 04 | 08 | FF | D2 | A1 | 68 | 94 | 04 | 08 | 8B | F6 | 10 | 85 | 04 | A3 |
| .text:080482F0 | EB | C6 | 05 | 70 | 95 | 04 | 08 | 01 | C9 | C3 | 89 | F6 | 55 | 89 | D2 | 75 |
| .text:08048300 | EC | 08 | A1 | 54 | 95 | 04 | 08 | 85 | C0 | 74 | 19 | B8 | 00 | 00 | E5 | 83 |
| .text:08048310 | 85 | C0 | 74 | 10 | 83 | EC | 0C | 68 | 54 | 95 | 04 | 08 | DF | 7C | 00 | FB |
| .text:08048320 | F7 | 83 | C4 | 10 | C9 | C3 | 90 | 90 | 55 | 89 | E5 | 83 | EC | 08 | C7 | 05 |
| .text:08048330 | 78 | 94 | 04 | 08 | 0C | 00 | 00 | 00 | 83 | EC | 04 | FF | 35 | 74 | 94 | 04 |
| .text:08048340 | 08 | FF | 35 | C4 | 10 | C9 | C3 | 55 | 89 | E5 | 83 | EC | 08 | E8 | 17 | FF | FF |
| .text:08048350 | FF | 83 | C9 | C3 | C4 | E8 | DE | FF | FF | FF | 44 | 84 | F0 | B8 | C7 | FF | FF |
| .text:08048360 | FF | C9 | C3 | C4 | 4E | 00 | 00 | E5 | 83 | 55 | FF | DD | 83 | E4 | 08 | 00 | 00 |
| .text:08048370 | 00 | 29 | C4 | E8 | 00 | 08 | C9 | C3 | 90 | 90 | E8 | FE | FF | FF | 83 | 78 | 94 | 04 |
| .text:08048380 | 08 | 68 | 4E | 00 | 00 | C9 | C3 | 90 | 90 | 04 | 08 | E8 | C4 | 53 | C1 | 10 | B8 | 00 |
| .text:08048390 | 00 | 68 | 00 | 00 | 90 | 90 | 04 | 08 | 2D | 89 | C6 | 90 | 55 | 56 | 08 | F8 | 8E | EE |
| .text:080483A0 | FF | FF | B8 | 5C | 73 | 0F | 89 | C6 | 90 | C3 | FF | 14 | 9D | 5C | 94 | 04 | 04 | 02 |
| .text:080483B0 | DB | 39 | C3 | F4 | 5B | 5E | C9 | C3 | FF | 89 | E5 | C0 | 8D | 50 | B8 | 08 | 31 |
| .text:080483C0 | 39 | F3 | 72 | F4 | 5B | 5C | 94 | 2D | 85 | C9 | C3 | F8 | 02 | 85 | FF | 5C | 43 |
| .text:080483D0 | 04 | 08 | 2D | 5C | 94 | 04 | 08 | C1 | D2 | F8 | F8 | 75 | EB | E5 | C0 | 8D | 94 |
| .text:080483E0 | 94 | 04 | 08 | 89 | DA | 4B | 85 | D2 | 83 | F8 | EB | 04 | 08 | 55 | 04 | FF | 75 |
| .text:080483F0 | 52 | A1 | 44 | 95 | 04 | 08 | 8B | 03 | 83 | FF | BB | 44 | 95 | 04 | 08 | 74 | 0C |
| .text:08048400 | 83 | EB | 04 | FF | D0 | 8B | 03 | 83 | F8 | FF | 75 | F4 | 58 | 5B | 5B | C9 | C3 |

```
.text:08048363  ; Attributes: bp-based frame
.text:08048363
.text:08048363                 public main
.text:08048363 main            proc near
.text:08048363                 push    ebp
...
.text:08048364                 mov     ebp, esp
.text:08048366                 sub     esp, 8
.text:08048369                 and     esp, 0FFFFFFF0h
.text:0804836C                 mov     eax, 0
.text:08048371                 sub     esp, eax
.text:08048373                 call    fool
.text:08048378                 sub     esp, 8
.text:0804837B                 push    AZ      ; input parms used by cpi-dist
.text:0804837B                 push    EL      ; input parms used by cpi-dist
.text:08048381                 push    offset aBI ; "b = %i\n"
.text:08048386                 call    cpidist
.text:0804838B                 add     esp, 10h
.text:0804838E                 mov     eax, 0
...
.text:08048393                 leave
.text:08048394                 retn
.text:08048394 main            endp
.text:08048394
```

; DATA XREF: _start+17

```
.text:08048328 ; Attributes: bp-based frame
.text:08048328
.text:08048328                 public cpidist
.text:08048328 cpidist         proc near              ; CODE XREF: foo1+6 p
.text:08048328                 push    ebp
.text:08048328                 pop     AX ; pop first input parm off stack store in AX
.text:08048328                 pop     BX ; pop next  input parm off stack store in BX
.text:08048328                 push    ebp
.text:08048329                 mov     ebp, esp
.text:0804832B                 sub     esp, 8
.text:0804832E                 mov     b, 0Ch
.text:0804832E                 mov     ax, globrl ; reference a global var
.text:0804832E                 add     ax, 360
    . . . . . .
.text:0804832E                 mov     b, 0Ch
.text:08048338                 sub     esp, 4
.text:0804833B                 push    dword ptr a+4
.text:08048341                 push    dword ptr a
.text:08048347                 push    offset aAlld   ; "a = %lld\n"
.text:0804834C                 call    _printf
.text:08048351                 add     esp, 10h
.text:08048354                 leave
.text:08048355                 retn
.text:08048355 cpidist endp
```

```
...
.data:08049460 data_start    db    0              ; Alternative name is '__data_start'
.data:08049461               db    0
.data:08049462               db    0
.data:08049463               db    0
.data:08049464               public __dso_handle
.data:08049464 __dso_handle  db    0
.data:08049465               db    0
.data:08049466               db    0
.data:08049467               db    0
.data:08049468 p_0           dd offset __DTOR_END__  ; DATA XREF: __do_global_dtors_aux+F
.data:08049468                                       ;           __do_global_dtors_aux+1F w ...    ⬅ 732
.data:0804946C               align 10h
.data:08049470               public a
.data:08049470 a             dq 7048860DDF79h     ; DATA XREF: foo2+19 r
.data:08049471 globr l       dd 8 389288399h      ; DATA XREF: used by CPI dist
.data:08049472 az            dd 8 ffh             ; DATA XREF: used by CPI dist
.data:08049474 el            dd 8 ffh             ; DATA XREF: used by CPI dist
.data:08049470                                    ; foo2+13 r
.data:08049478               public b
.data:08049478 b             dd 7                 ; DATA XREF: foo2+6 w
.data:08049478                                    ; main+18 r
.data:08049478 _data         ends
...
```

```
.text:08048363 ; Attributes: bp-based frame
.text:08048363
.text:08048363                 public main
.text:08048363 main            proc near               ; DATA XREF: _start+17 o
.text:08048363                 push    ebp
...
.text:08048364                 mov     ebp, esp
.text:08048366                 sub     esp, 8
.text:08048369                 and     esp, 0FFFFFFF0h
.text:0804836C                 mov     eax, 0
.text:08048371                 sub     esp, eax
.text:08048373                 call    foo1
.text:08048378                 sub     esp, 8
.text:0804837B                 out     AZ, 488h        ; input parms used by cpi-dist via external interface
.text:0804837B                 out     EL, 496h        ; input parms used by cpi-dist via external interface
.text:0804837B                 out     globr 1, 4a2h   ; global var used by cpi-dist via external interface
.text:08048381                 push    offset aBI      ; "b = %i\n"
.text:08048386                 int     134 'call external ISR to pass execution to external CPI procedure
.text:0804838B                 add     esp, 10h
.text:0804838E                 mov     eax, 0
...
.text:08048393                 leave
.text:08048394                 retn
.text:08048394 main            endp
...
```

```
.text:08048328 ; Attributes: bp-based frame
.text:08048328
.text:08048328                 public foo2
.text:08048328 foo2            proc near                ; CODE XREFfoo1+6 p
.text:08048328                 push    ebp
.text:08048329                 mov     ebp, esp
.text:0804832B                 sub     esp, 8
.text:0804832E                 mov     b, 0Ch
.text:08048338                 sub     esp, 4
.text:0804833B                 push    dword ptr a+4
.text:08048341                 push    dword ptr a
.text:08048347                 push    offset aAlld    ; "a = %lld\n"
.text:0804834C                 call    _printf
.text:08048351                 add     esp, 10h
.text:08048354                 leave
.text:08048355                 retn
.text:08048355 foo2            endp
```

```
//
// CPI_DIST: Hardware processes and configuration code
//
#ifdef WIN32
#include <windows.h>
#endif
#include <stdio.h>
#include "co.h"
#define MONITOR
#ifdef MONITOR
#include "cosim_log.h"
#endif
// Software processes defined in CPI_DIST_sw.c
extern void Consumer(co_stream input_stream);
extern void Producer(co_stream output_stream, co_parameter iparam);
//
// Hardware process
//
void DoDistance(co_stream input_stream, co_stream output_stream)  // az: azimuth, el: elevation, calcdist: range
{
    char c;
    char[8] ts;
    double az, el, globrt, calcdist   // az: azimuth, el: elevation, calcdist: range
    IF_SIM(cosim_logwindow log;)
    IF_SIM(log = cosim_logwindow_create("DoDistance");)
```

910

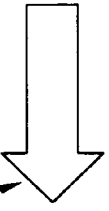

```
//
// Configuration function
//
#define BUFSIZE2
void config_CPI_DIST(void *arg)
{
    int iterations = (int) arg;
    co_stream s1,s2;
    co_process producer, consumer;
    co_process DoDistance;
    IF_SIM(cosim_logwindow_init(););
    s1=co_stream_create("Stream1", CHAR_TYPE, BUFSIZE);
    s2=co_stream_create("Stream2", CHAR_TYPE, BUFSIZE);
    producer=co_process_create("Producer", (co_function) Producer, 2, s1, iterations);
    doDistance=co_process_create("DoDistance", (co_function) DoDistance, 2, s1, s2);
    consumer=co_process_create("Consumer", (co_function) Consumer, 1, s2);
    co_process_config(DoDistance, co_loc, "PE0"); //Assign DoDistance to a hardware element
}
co-architecture co_initialize(int interations)
{
    return(co_architecture_create("CPI_DISTArch", "generic", config_CPI_DIST, (void *) iterations));
}
```

EXTRACTION OF EXECUTABLE CODE AND TRANSLATION TO ALTERNATE PLATFORM

CROSS REFERENCE TO RELATED APPLICATION

Pursuant to 35 U.S.C. §119, the benefit of priority from provisional application 60/900,306, with a filing date of Feb. 6, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to providing anti-tamper techniques to inhibit reverse engineering of pre-established binary code on an original system. In particular, this invention relates to extraction and translation of select functions in the binary code for separate processing on a secure platform while expunging those functions from the original system.

SUMMARY

Various conventional anti-tamper techniques include incorporation of physical barriers to hardware, tamper detection mechanisms and/or complete overhaul of existing systems. Such conventional anti-tamper techniques yield disadvantages addressed by various exemplary embodiments of the present invention. In particular, the conventional manners may be either insufficient and/or cost-ineffective for particular applications. A technique for transferring binary instructions from a computer system to an external platform (e.g., secure and removable) is described herein.

The process begins by extracting binary instructions from the computer system. The instructions include a function at a register location. The process continues by disassembling the binary instructions to produce an intermediate representation of the function. This representation can be provided in symbolic characters, such as ASCII. An interruption (e.g., interrupt call) is inserted at the register location, and the interruption is linked to a routine call for the function. The process analyzes the intermediate representation for data dependency to identify internal data references for said routine call and external data references for said function to produce a data dependence representation.

The process continues by reconfiguring the data dependence representation to resolve any discrepancy between the internal and external data references to thereby produce a reconfigured representation. The process further analyzes the reconfigured representation for control flow logic to produce a logic hierarchy representation for the function. The process then undertakes translation of the logic hierarchy representation to produce a source code corresponding to operation of the function, the source code then being compiled on the external platform to produce an object code to be linked with the binary code upon execution.

Other various embodiments alternatively or additionally provide for replacing the function at the location on the computer system with obfuscation code. Also, the analysis of the reconfigured representation may include its optimization to reduce computational load and/or insertion of a register association between each internal data reference for the routine call and each external data reference for the function. Alternate embodiments include reconfiguring the data dependence by incorporating on the external platform a library that the function may call with the external data references, or else by incorporating on the external platform a protocol interface that routes the routine call from the interruption with the internal data representation that includes input to the function with the external data representation that includes output.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 6 is a textual view of a binary code extract from the host platform;

FIG. 7A is a textual view of a main disassembly list;

FIG. 7B is a textual view of a function disassembly list;

FIG. 7C is a textual view of an initial data section;

FIG. 8A is a textual view of the main disassembly list after function removal;

FIG. 8B is a textual view of the function disassembly list after obfuscation;

FIG. 9A is a textual view of a first portion of source code for the anti-tamper module;

FIG. 9C is a textual view of a third portion of the source code.

DETAILED DESCRIPTION

Figure 1:
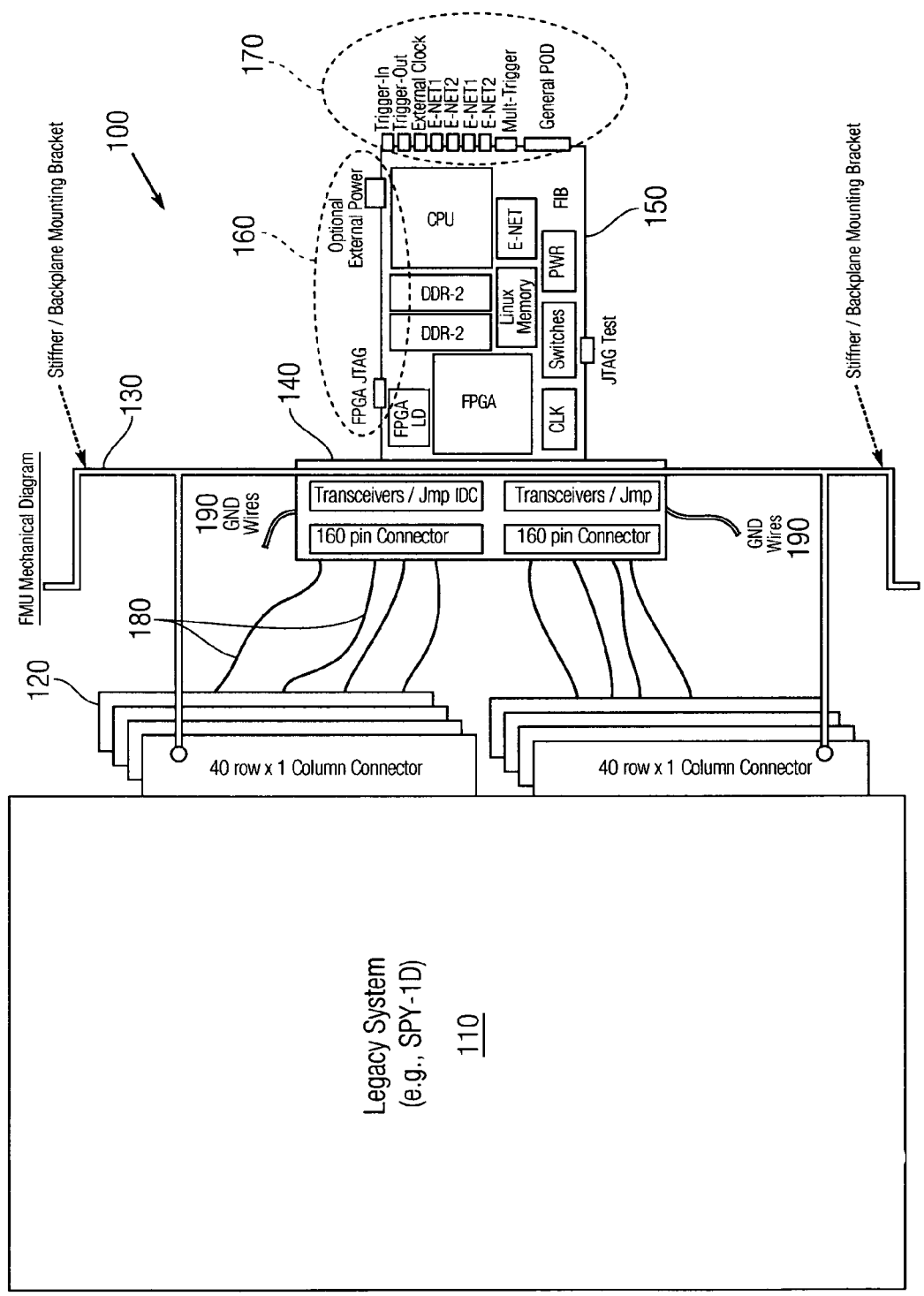
FIG. 1 is a plan view of a legacy system with a removable anti-tamper module.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Binary Synthesis Translation (BST) represents a technique that safely enables extraction of one or more portions from a legacy executable code labeled Critical Program Information (CPI) to be compiled, linked and executed on a separate secure platform as a method in anti-tamper application counter technology (ATACT) to mitigate security gaps. A legacy platform represents a pre-existing computer system, such as commercial-off-the-shelf (COTS) hardware. An executable code represents compiled machine-language instructions in binary form produced from translation of higher-level language source code (e.g., written in Fortran, Ada, Pascal, C, etc.) to perform specific operations to yield a particular result, such as a target solution for a specific weapon system.

Upon such extraction of this binary code, advanced optimization and/or translation operations can be applied. A secure platform can be a removable field programmable gate array (FPGA) and be custom-designed for application-specific operations. Colorado Engineering, Inc. of Colorado Springs, Colorado supplies an exemplary such platform configured as firmware automated test system (FATS) board. This approach enables the extracted code to be separately executed upon the secure platform rather than the original legacy system, which may be subject to compromise by reverse-engineering. Vulnerability of legacy systems can increase dramatically for hardware distributed through a foreign military sale (FMS).

To threaten a legacy system, an attacking system may interrogate an integrated circuit in that system by issuing random input signals to the circuit and analyzing its response signals. A variety of such circuits are employed throughout the Navy for various weapons platforms, such as the AN/SPY-1D(V) phased array radar used aboard naval combat vessels. Select functions of those systems might be compromised without segregating select instructions to and/or responses from the circuits. Such segregation may involve development of anti-tamper (AT) protections. However, older systems may instead be redesigned rather than retrofitted, depending on which course of action may be more expedient or less expensive. Due to the customer (including military) preference for COTS software, constructing a new system absent relevant source code remains impractical. Instead, attention focuses on providing a secure mobile "add-on" type solution that includes maximum flexibility and portability.

Decompilation represents one operation for reverse-translating from executable binary code to reconstruct equivalent human-readable source code. The first known code decompiler was developed in 1960 through a project directed by Maury Halstead using Neliac as a Universal Computer Oriented Language. Joel Donnelly and Herman Englander implemented the D-Neliac decompiler for the Univac M-460 Countess Computer while on Maury's staff. The D-Neliac decompiler was an operational decompiler that decompiled Univac M-460 binary code into Neliac source code.

System platform dependency and application programming interface (API) routines native to a given operating system are bound into each binary image by the compiler. API routines may be written in the language of the compiler or in lower assembler. The operation results in a binary program that contains not only the routines written by the programmer, but several other routines linked in by a linker. A typical binary program written in C to display "hello world" and compiled on a COTS platform contains over twenty-two different API subroutines in the binary program. The same instructions written in Pascal generate more than thirty-seven subroutines in the executable program. Additional code may be required to construct a graphical user interface (GUI).

Conceptually, a decompiler functions very similarly to the way a compiler operates. The decompiler retrieves instructions from one format and translates them to another. Decompilation may be subdivided into several steps or "phases" to accomplish this translation. In association with this disclosure, select steps are based on compiler and optimization theory using several different components of existing Open-Source decomplilers, such as dcc, Boomerang and Andromeda. Cristina Cifuentes wrote the UNIX-based dcc decompiler. Boomerang, primarily developed by QuantumG and Mike van Emmerik, is a UNIX/Windows-based GUI system and perhaps represents the most mature of the major decomplilers in current use. Andromeda is a GUI version for Windows developed by Andrey Shulga.

FIG. 1 shows a plan view of an exemplary ATACT secure hardware configuration 100. A legacy system 110 connects to a transceiver connector array 120 having an arrangement of 40-rows and 1-column. The connectors 120 communicate with an integrated daughter board (IDC) 130 mounted to a platform 140 that contains the legacy system 110. A removable ATACT module 150 may be detachably inserted into the IDC 130. This module 150 may be represented by a FATS integrated board (FIB), which includes several components as well as external connectors 160 and 170. The module 150 represents a secure external platform on which to execute extracted CPI code. The connector 120 communicates with the IDC 130 by wires 180 and is grounded by fixed potentials 190.

The module 150 may include several components, such as an FPGA, a central processing unit (CPU), FPGA load (LD), dynamic ram (DDR), Ethernet (ENET), power regulator (PWR) and switches. The external connectors may include power and/or Joint Test Action Group (JTAG) pins 160 and input/output (I/O) pins 170. JTAG complies with the IEEE 1149.1 standard for test access ports. The ATACT module 150 may be physically protected by a tamper-detection circuit and surrounded by an external coating to inhibit reverse engineering.

The BST process for obtaining such a configuration 100 begins with the legacy system 110, which incorporates a set of machine-executable instructions in binary form, having been compiled from an earlier assembly or source code that was compiled and linked with library functions and memory addresses. A portion of the code represents CPI determined from the addresses. The binary CPI portion can be disassembled to produce a tabular sequence. From this sequence, analyses may be performed to establish data dependencies and code flow (i.e., conditional order sequence). These instructions may be presented in symbolic characters for intermediate representation. These symbols can be stored as data within internal data structures created by an executing program Global Data Flow analysis can be conducted on the intermediate representation to construct a data dependency list for each exported CPI function and resolve all data register dependencies. The Data Flow may exchange information with a Symbol Table for register cross-referencing. Control Logic Flow analysis provides function and subroutine calls to connect each diverted call to an interrupt for forwarding to the secure FPGA for processing. The data and control analyses can be used to generate CPI Relocatable Library functions in a dynamic CPI library. The operations, including the CPI functions can be tested and evaluated using the CPI dynamic library to verify proper execution. Upon satisfactory completion of the evaluation, the CPI function code can then be translated to match the specific CPU core to be implemented in the FPGA on the ATACT module 150. Finally, the CPI library loaded in the FPGA can then be tested with the legacy system 110 for intended operation.

Due to differences in hardware between the legacy system 110 and the ATACT module 150, various instructions can be optimized to streamline computational operations. These analyses and optimizations thereby yield synthesized CPI source code or CPI(S) to be compiled on either a library platform or the ATACT module for linking with the remaining legacy system binary code.

The CPI instructions originally installed on the legacy system 110 may be replaced at its entry point with a redirection to an interrupt table, which may call a simulation library that contains the transferred CPI(S) instructions that have been recompiled. Because the legacy system 110 and ATACT module 150 may differ in clock speeds (the SPY-1D running typically much slower than more recent FPGA designs), an interrupt table represents one exemplary method to synchronize data exchange between these platforms. For example, a call to a CPI function with inputs may be routed to the interrupt table.

The function may be processed by the CPI(S) in the simulation library that returns outputs to the interrupt table for providing to the call after an appropriate wait state for the legacy system. Upon verification of the CPI(S) function, the code may be translated as a CPI(ST) function for integration with an interface protocol on the ATACT module 150. The FPGA execution code containing the CPI(ST) remains encrypted; this code can be decrypted with a non-volatile Key that is not externally accessible. The FPGA has input line tamper detection capability to compliment physical protections of the ATACT module 150.

For example, the FPGA may include a protected critical circuit, an input monitoring model and an output obfuscation model. Data flow through an input monitoring model to be characterized as either conforming as operationally expected or attack by random signals. An attempt to tamper with the FPGA can be detected by invalid (e.g., random) inputs, so that the input monitoring model shifts to an alert state, either issuing an alarm of the attack or producing obfuscated outputs to the attacking interrogator. By contrast, conforming data pass through the critical circuit and the output obfuscation model without obfuscation or warning. This is subsequently described in portions of this disclosure on learning and operational phases.

Figure 2:
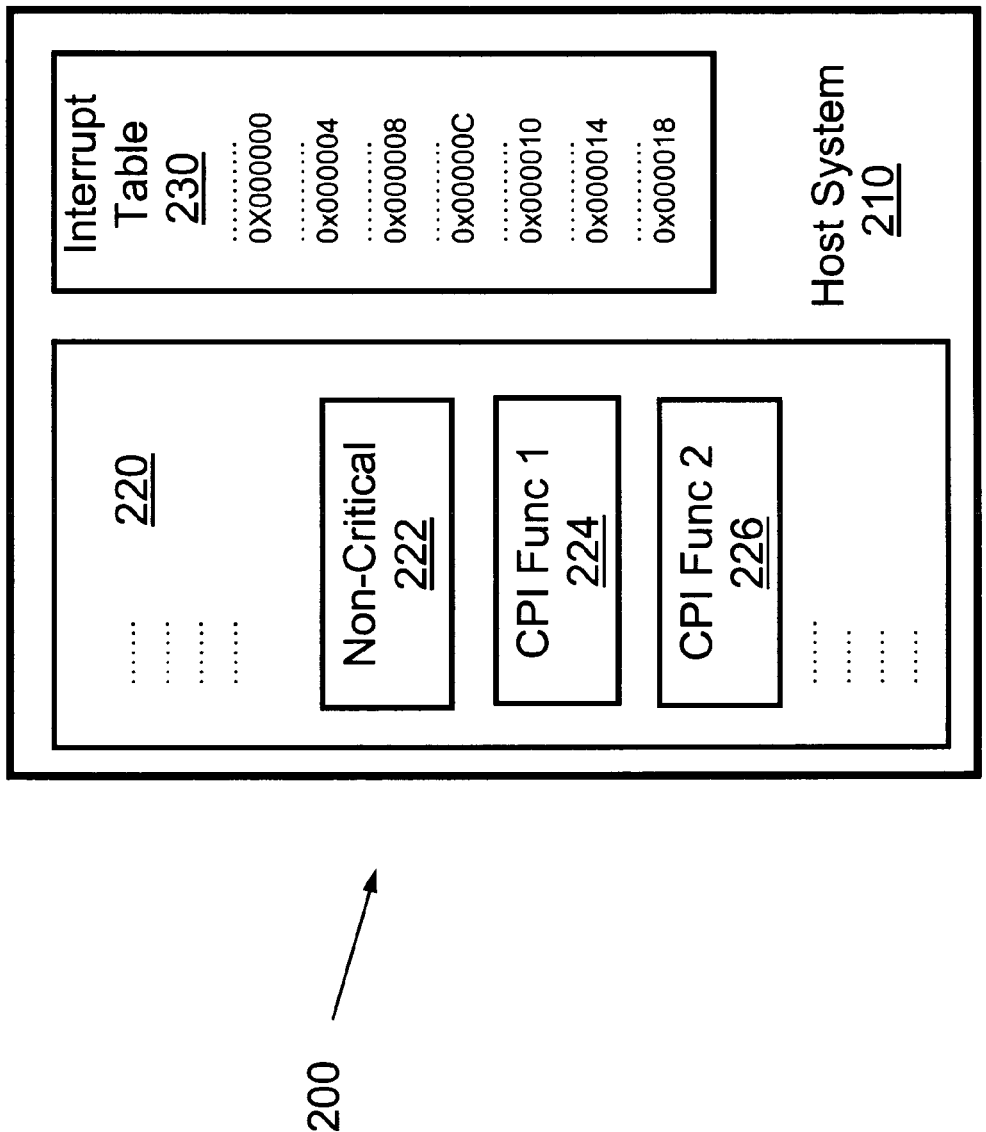
FIG. 2 is a block diagram view of a host platform of the legacy system with functions installed.

FIG. 2 shows a block diagram view of a legacy system 200 without ATACT protection. A host platform 210 includes an instruction list 220 that includes various functions. These functions may include non-critical operations 222, as well as exemplary CPI Func1 and CPI Func2 respectively as 224 and 226. The host system also includes an Interrupt Table 230 having a set of values. The CPI functions 224, 226 remain vulnerable to interrogation in this configuration.

Figure 3:
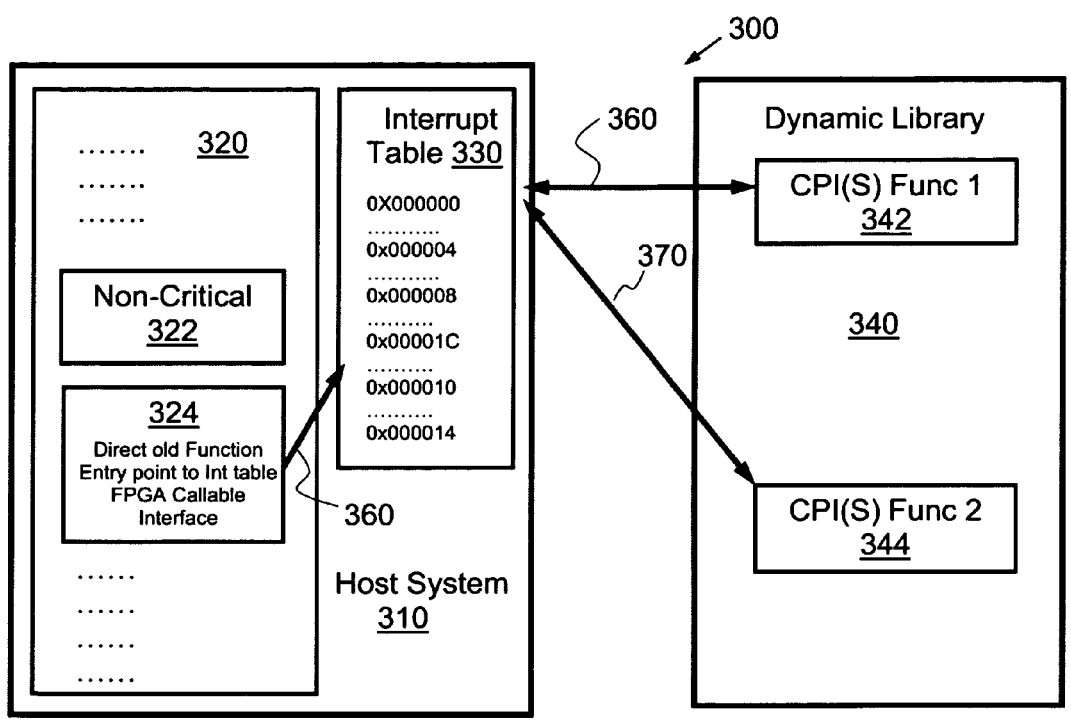
FIG. 3 is a block diagram view of the host platform connected to a simulation library via an interrupt table.

FIG. 3 shows a block diagram view of a legacy system with segregation 300 to extract CPI content and resolve memory dependencies. The host platform 310 includes an instruction list 320 having non-critical operations 322 and a redirection operator 324. The host system 310 also includes an Interrupt Table 330 that represents an FPGA callable interface. The redirection operator 324 may direct a function's entry point to the Interrupt Table FPGA callable interface. A separate repository 340 performs binary synthesis on the CPI functions to include exemplary CPI(S) Func1 and CPI(S) Func2 respectively as 342 and 344. The repository 340 may initially reside in conjunction with the host system 310, but without interaction.

Upon establishing a connection between the host system 310 and the repository 340, a CPI library may be packaged and tested on the host system 310. The previous function entry point 324 is directed to the Interrupt Table 330 by an interface pointer 350. The Interrupt Table 330 may then be directed via connections 360, 370 to the repository 340 representing a dynamic library containing the CPI(S) Func1 and CPI(S) Func2 as 342 and 344, respectively. The CPI(S) code may be translated to match an FPGA core to product CPI(ST). For example, CPI(S) Fund 310 can be connected to a Hewlett-Packard platform, an Intel X86 processor, a PowerPC, a SPARC workstation and/or a reduced instruction set computer (RISC) platform.

Figure 4:
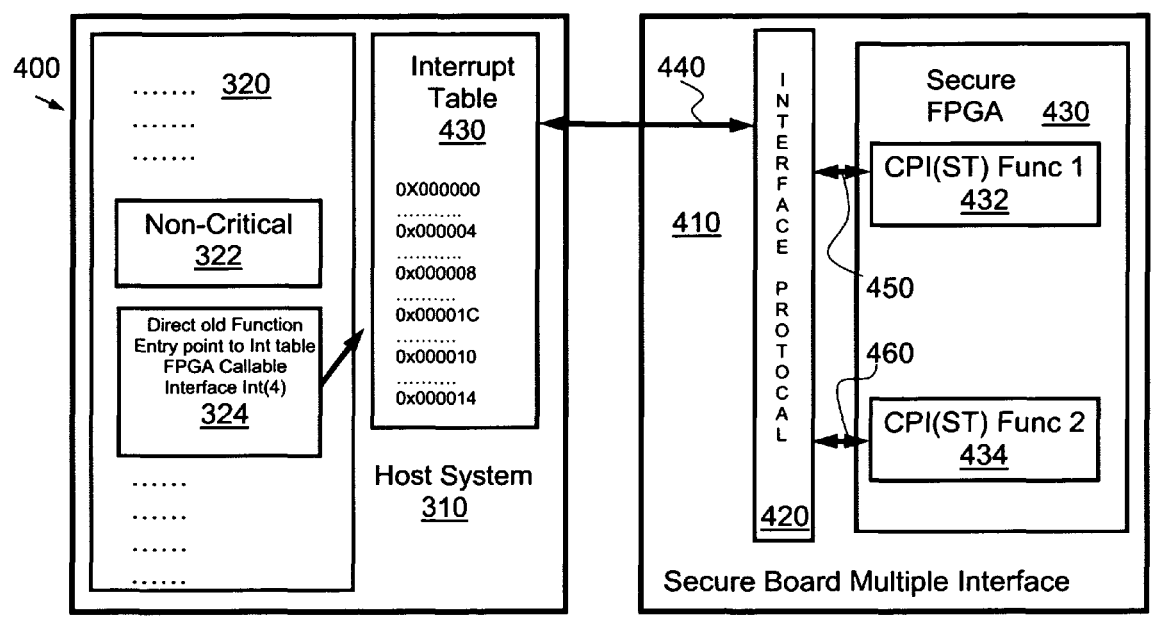
FIG. 4 is a block diagram view of the host platform connected to the anti-tamper module via the interrupt table and an interface protocol.

FIG. 4 shows a block diagram view of the system 400 to write the CPI library into the FPGA. A secure board multiple interface 410 adjacent to the host system 310 includes an interface protocol 320 and a secure FPGA 430 having CPI (ST) Fund and CPI(ST) Func2 respectively as 432 and 434. The Interrupt Table 330 may communicate through the protocol 520 by a channel 440. The protocol 420 may then connect to the CPI(ST) functions by their respective interfaces 450, 460.

Figure 5A:
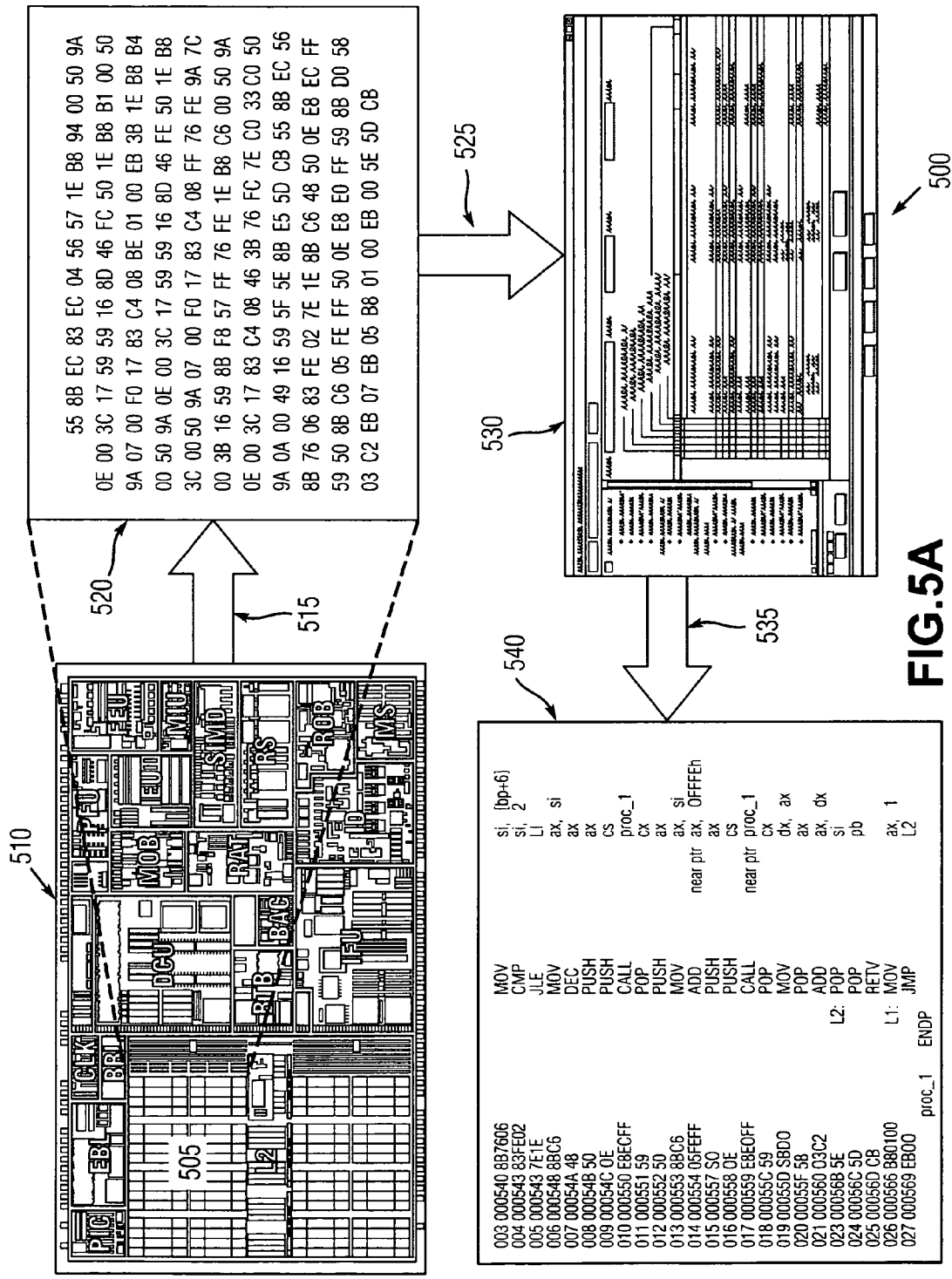
FIG. 5A is a block diagram view of a decompilation process.

FIG. 5A shows a block diagram view 500 for identification and extraction of CPI via BST. A static random access memory (SRAM) 505 integrated on a Pentium-III 510 contains binary instructions. An extraction process 515 retrieves a select portion of binary code 520 corresponding to CPI functions. This extracted binary code 520 may be disassembled 525 to produce disassembly code 530 as data structures, which can be rearranged 535 into intermediary representation 540, which may comprise high and/or low level code.

Figure 5B:
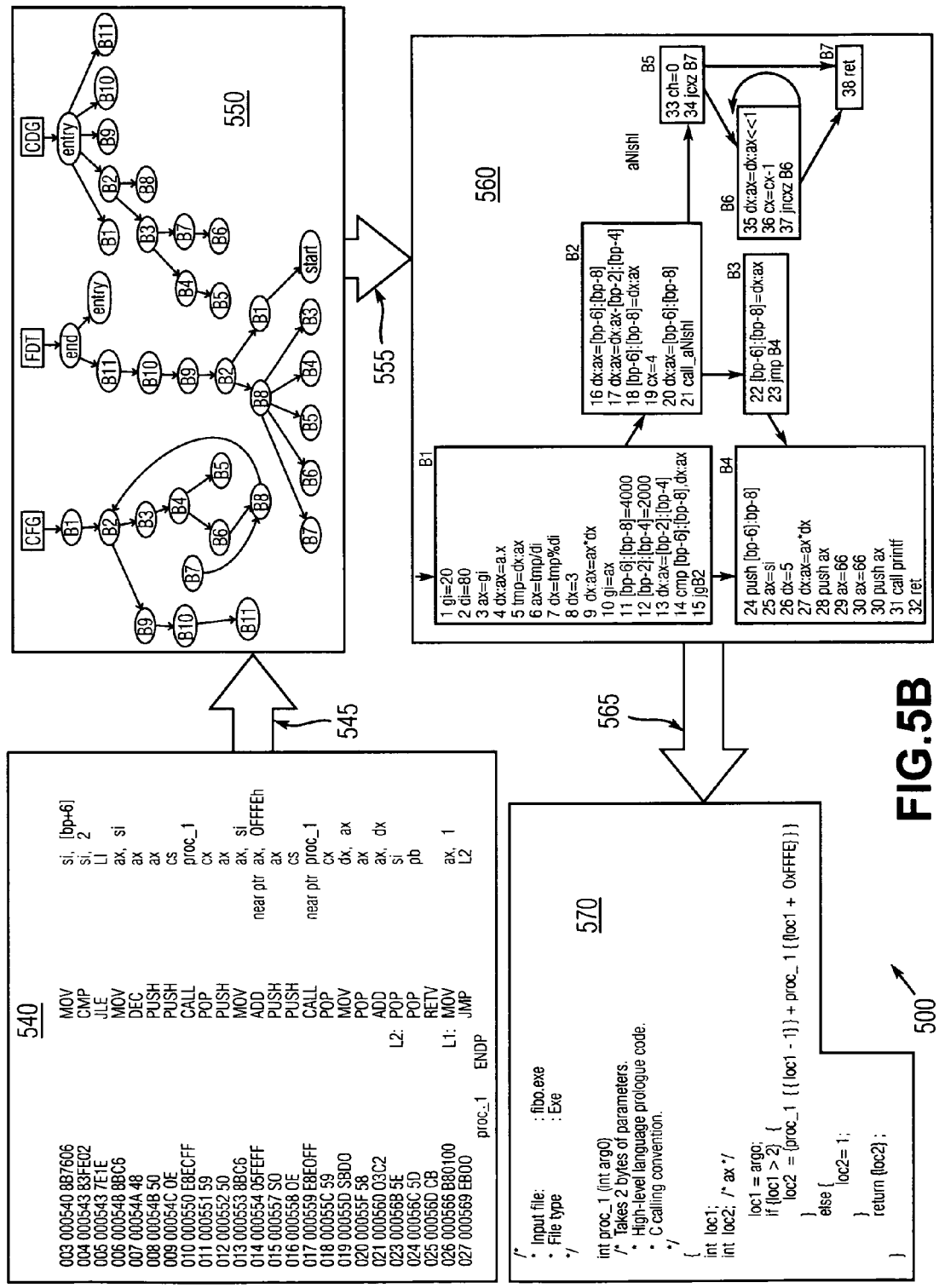
FIG. 5B is a block diagram view of a code simulation and translation process.

FIG. 5B shows the block diagram view 500 continuing to synthesis and translation of the CPI. The intermediate representation 540 (written for example in ASCII) may be analyzed 545 through global data flow to produce a data dependency map 550 and further analyzed 555 for control flow to produce a control logic map 560. These instructions and addresses can be translated 565 into an optimized source code 570.

Optimization represents a process to alter instructions for improved operational performance. The analysis includes detection of data dependencies in memory registers to enable exchange of variables from a vulnerable system to be off-loaded and processed on a secure platform. Instructions can be optimized by replacing high-overhead or bottleneck operations with substitute instructions. Examples of optimization techniques include loop unrolling (explicit replication of the loop body multiple instances) and inverse multiplication (to avoid computationally intensive division). Careful attention can avoid creating hazards that can cause the instructions to produce output other than that intended.

Operating a radar system might include an example function of delivering a range distance as an output in response to azimuth and elevation inputs. FIG. 6 shows hex bin dump contents 600 from an initial legacy program (with symbolic line-terminating characters suppressed), analogous to block 520 on the host platform. The column of data following the "text08048 . . . " prefix represents the original legacy byte swapped binary image consisting of instruction and data. These data may be read directly off a read-only-memory (ROM) storage device.

FIGS. 7A-7C show portions of a disassembly list 700 in ASCII from the legacy contents 600 from which to eventually obtain source code in ANSI-C. In this example, the CPI function returns the range in response to inputs of azimuth and elevation. FIG. 7A illustrates a selection from the main program 710 of the disassembly list of the legacy code 700. Arrow 712 points to text lines that push input variables AZ (for azimuth) and EL (for elevation) on the memory stack. Arrow 714 points to the text line that calls the cpidist procedure to determine the range distance from the azimuth and elevation. FIG. 7B illustrates a portion from the CPI function procedure 720 that pop the two input parameters. Arrow 722 shows the two inputs popped off the stack and stored in general purpose registers for math operations. Arrow 724 references one global variable globr. FIG. 7C shows an initial data section 730 with the three variable of interest, each being double-precision with length of eight-bytes. Arrow 732 shows three consecutive lines referencing the three variables used by the function.

After analyzing the disassembled list using BST methodology for data and control flow, the input parameters can be diverted to an interface for external processing. FIGS. 8A and 8B show a disassembly list 800 after modification to replace the CPI function. FIG. 8A illustrates the legacy main 810 after employing BST. In such a case, an I/O chip such as an "8255" may be used to store variable data that can be referenced by the CPI external interface during execution. Arrow 812 points to three out commands write the value of each variable to the 8255-chip in intervals of eight bytes at a time. Each variable has a double precision requiring eight bytes. Arrow 814 points to an interrupt service routine interface to pass execution to the external CPI function. FIG. 8B illustrates the CPI procedure 820 after BST and obfuscation resident on the legacy system. The CPI functions are replaced and remotely executed to inhibit reverse engineering.

Figure 9B:
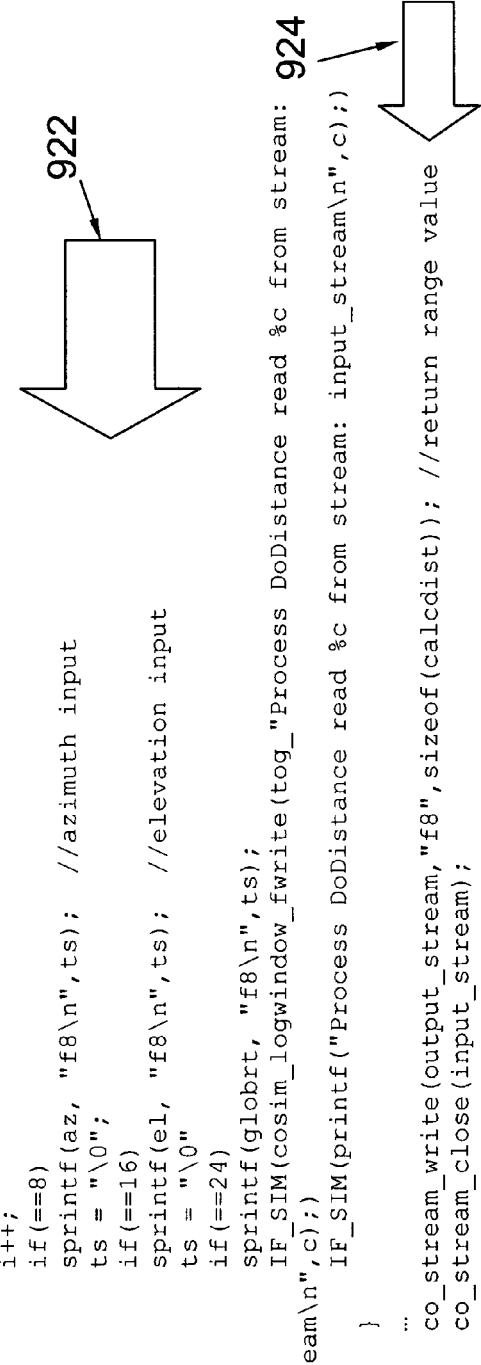
FIG. 9B is a textual view of a second portion of the source code.

Following the translation of the reconfigurable CPI functional instructions into source code written in Impulse-C to be compiled on the FPGA and linked to the legacy system. FIGS. 9A-9C show an exemplary listing 900 including all necessary hooks (or stubs) to receive relevant library calls. FIG. 9A illustrates the beginning portion 910 with arrow 912 showing input and return variables in double precision. FIG. 9B illustrates the middle portion 920 with arrow 922 pointing to the azimuth and elevation inputs and arrow 924 pointing to the range distance output. FIG. 9C shows the final portion 930 that defines buffer size.

Various exemplary embodiments provide an automatic system that transform a given binary image from a given host platform into a newer optimized binary image that executes faster on a variety of target platforms. The system can operate with or without original source code. In select embodiments, the system may translate and synthesize any input binary image in to a mobile optimized code set that will execute on any target platform.

Binary Synthesis Translation (BST) can be characterized as a system composed of several phases which are grouped into modules dependent on language or machine features. The front-end is a machine dependent module that parses the binary program, analyzes the semantics of the instructions in the program, and generates an intermediate representation of the program. A control flow graph may be generated for each subroutine. BST can operate with language and machine independent modules. The system analyzes the low-level intermediate code and transforms it into a high-level representation available in any high-level language, and analyzes the structure of the control flow graph(s) and transforms them into graphs that make use of high-level control structures. Finally, the back-end is a target language dependent module that generates code for the target language.

BST benefits from compiler and Application Programming Interface (API) signatures resident within a binary image. In the former, compiler signatures for any start-up code are ignored and not decompiled. In the latter, any API references are used for variable type information and propagated throughout the function analysis process. The BST system comprises the following modules, each with a set of corresponding sub-modules:

Front-end (machine mode dependent)
    Syntax Parser Analyzer
    Semantic Analysis
    Intermediate Code Generation
    Control Flow Graph Generation
Analysis (machine code independent)
    Global Data Flow Analysis
Back-end
    Code Generation, Optimization, Translation The syntax parser analyzer in the "front-end" groups bytes of the source program into grammatical phrases (or sentences) of the source machine language. These phrases or Idioms may be stored in a hierarchical tree. The hierarchy in machine code is restricted to a maximum of two levels. The primary problem encountered while parsing machine code is distinguishing between data and instructions. For example, a case table usually residing after the function that invokes may be located in the code segment, with the decompiler unable to determine which the table represents. This is a common problem with COTS memory architectures that utilize the von Neumann architecture (in which data and code reside in same memory). Instructions cannot be parsed sequentially by assuming that the next byte always holds an instruction. Many machine dependent heuristics are needed in order to determine the correct set of instructions.

The semantic analysis phase checks the source program for the semantic meaning of groups of instructions. The "type" information may be gathered and propagated across the subroutine. Based on the assumption that binary programs were produced by a compiler, the semantics of the machine language may be presumed correct in order for the program to execute (assuming the program originally executed properly). Thus, semantic errors may be assumed not to be extant in the source program unless the syntax parser has performed an error such as data have been parsed instead of instructions.

The process of intermediate code generation enables an intermediate representation of the source code to be created for analysis and modification. The intermediate representation can be used to enable the decompiler to analyze low-level structures within the module. A road map may be followed during the generation process to facilitate migration to the target language of the reconstructed source code. This phase may use three-address code instruction mapping.

A control flow graph of each subroutine can be generated from the intermediate representation. This approach can be very useful for removing "dead code" and obfuscations, and determining "def-use" relationships across procedures. High-level control structures used in the program can also be identified. This graph may assist in removal of compiler generated intermediate jumps.

Redefining this intermediate representational code can be facilitated by data flow analysis by identifying high-level language expressions. Temporary registers and condition flags may be removed as these constructs are not used in high-level languages. This process involves determining data-dependencies and defined usages within a basic block of code.

API signature-type information may be used to assist in identification of variable types. This information may then used throughout the procedural data scoping process. Once the procedure data scope has been established, then a higher order "inter-procedural" data scope may be obtained. During this process complex global data flow analysis equations are solved for each procedure. This includes any parameters that are referenced by the procedure and any return values, and any global data variables are modified inside the procedures.

The final phase or "back-end" of the process involves producing target source-code by code generation after specifying the target language along with any optimizing or specific "in-lining" options. Traversal of the control graph for each sub-routine may be implemented to handle such issues as variable naming, local stacks arguments, and register variable identifiers. Additionally, the control-structures and'intermediate instructions created in earlier steps may be translated at this phase to high-level language statements.

The previous description concerns converting machine language to a higher-level language source. Many weapons systems to be protected use machine language originally derived from assembly language source, rather than a high-level language such as Ada, C or Fortran.

An exemplary approach with the SPY 1-D radar combat system begins by identifying the CPI machine code to be extracted. The extracted binary code is disassembled into an intermediate representation from which may be generated control flow graphs, conduct semantic analysis, data flow analysis, single static assignment, data propagation, register variable identification, data type propagation, data type analysis, primitive data types, complex data types, control flow analysis. This enables extraction of a function or functions void of any data dependencies and API dependencies. This function renders a sequence of code that can be executed outside its initial environment.

After CPI extraction, the host executable code 320, shown in FIG. 3, should be patched where CPI code once resided at its function entry point 324. In addition, the external CPI function (on the module) can be invoked by the host machine. The next instruction after the function entry point 324 can be replaced with an interrupt service routine (ISR) call. This ISR may reside within the host Interrupt Table 330. The ISR may examine the contents of the stack contained by the process that invoked the ISR to identify a return address, which points back to the location directly following the ISR invocation. This information enables determination of which CPI function call is invoking the ISR routine.

For the CPI to execute remotely, a mechanism may be provided to enable the CPI function to execute an ISR instruction (on the host 110) remotely (on an external secure module 150). For example, the CPI function calls an operating system API routine that in turn issues the ISR request. The host (target) machine and the external secure platform (e.g., FATS integrated board) can be provided with a remote procedure call (RPC) interface module (IDC 140) that includes both client and server capability to permit a CPI function to issue an ISR call while executing remotely.

In the event of the CPI function issuing an ISR call back to the host machine, a CPI call may be issued within the context of a remote procedure call client. The host machine functions within the context of a remote procedure call server. Upon completion of transforming and extracting the CPI code from the original executable, a remote relocatable library can be packaged as a library module 340 shown in FIG. 3. This library module can be initially tested with in the original host executable process environment. This operation can be performed to ensure that all dependency (memory, system call) operations have been resolved correctly. This process is very similar to executing a program and then at run-time issuing a system load library call to load a given dynamic library into a process space.

A validation and verification operation can be conducted to insure proper operation of the CPI. The CPI functions may be coded on a secure FPGA chip 430, shown in FIG. 4, that resides on an external FATS integrated board 150. The FPGA may employ a 128-bit Non-Volatile encryption strategy with a key that cannot be extracted externally. At this point the type of core execution image to reside within the FPGA may be decided. Under a soft core execution environment (EE), the system runs at a greatly reduced speed but with greater flexibility. Under a hard-core EE image the system can execute up to 800 MHz. Changing the EE of the FPGA may require translation of the CPI code to match the EE of the FPGA. The Altera® that runs about 800 MHz represents an exemplary FPGA for these purposes.

This approach introduces a degree of operational latency by virtue of passing thru the ISR and RPC code. This may not present difficulties with the 1750-CPU found in the SPY-1D which currently runs at 33 MHz. The principle timing concern in this case involves not issuing a return too early back to the host process. For newer COTS systems however, typical CPUs execute internally at 3.0 GHz range, but remain nonetheless able to fetch instructions and memory only at local bus speeds which are typically in the 800 MHz range.

Techniques as Function-Level Working-Set tuning can be used to rebuild the extracted functions with BST. The functions can be profiled for execution within a target executable of the FPGA. The functions that are executed more frequently than others can be moved closer to the top of the module. This way the operating system can keep the popular code in memory and only load the remainder of the module as needed (and then page the remainder out again at the conclusion of use). This approach can provide for a significant increase in speed by reducing on-demand memory paging.

Operational speed of the extracted function can be further increased by implementing strategies like reciprocal multiplication, as mentioned in context of optimization. Reciprocal multiplication uses multiplication instead of division in order to implement the division operation. Typically, multiplication is four to six times faster than native division operations. This process involves multiplying a dividend by a fraction that represents the reciprocal of the divisor. For example, dividing thirty by three can be performed by computing the reciprocal of three, (or one-third) to yield approximately 0.3333333, and then multiplying thirty by this reciprocal of three to produce the correct result of ten.

Further optimization can be achieved by deconstructing an instruction and implementing its micro-code underpinnings. A typical floating point instruction found in many CPI algorithms can frequently be implemented as lower-level multiply and divide operations. Symmetric parallel optimization can be applied during the construction process with which to fabricate a custom micro-instruction to run much faster than the original instruction. The FPGA may include additional I/O pin tamper detection safety circuitry to prevent black-box attack. In order to defeat probe attempts (i.e., interrogation with arbitrary input signals), an Altera FPGA is equipped with a tamper detection capability. This may be performed by learning and operational phases.

In the learning phase, an Input Monitoring Model is trained from real or simulated inputs and outputs to the device to be protected. These inputs and outputs can be measured, obtained from the device specification, or extrapolated from piecemeal knowledge of the device's characteristics. Upon creation of this database of known I/O combinations (both normal operational inputs and simulated tamper-style inputs), the database may be applied to a time-sensitive Input Monitoring Model.

In the operational phase (such as after FMS), the component under protection is considered to be either in its normal operational environment or else is outside of this environment and being subjected to laboratory attacks. External inputs are received by the augmented anti-tamper package and fed directly to the protected component, the Input Monitoring Model and the Output Obfuscation Model. These inputs come from either the intended environment or from laboratory testing; the component does not identify the source initially. In the former case, the Input Monitoring Model will respond with a "No Tamper" signal. This signal is used by the Output Obfuscation Model's Gating Mechanism to pass the normal operational outputs from the critical component through to the output of the augmented package.

Upon recognizing that the input represents an attack, the Input Monitoring Model outputs a "Tampered Input" signal, which initiates processing within the Output Obfuscation Model. Based upon the temporal inputs being received and the indicator from the recognizer, the generator produces obfuscated outputs that are then passed through the gating mechanism to the output.

BST solves many interrelated software vulnerability problems present in modern computer systems as well as older legacy systems. BST can aid in identifying polymorphic viral code that escapes scrutiny of today's current signature-based anti-virus products. BST can be used to mitigate buffer overflow vulnerabilities in legacy/COTS code by extracting unsecured code to be executed within a secure framework. BST can be used to prevent Reverse Engineering efforts by protecting CPI code in a secure shielded environment particularly software vendor's protection mechanisms can be extracted and executed in a secure environment as well as military weapon systems' CPI content. BST can be used to assist in software optimization and or upgrading of obsolete legacy code to modern software libraries.

The advantages over current technology include the ability to synthesize binary code to run on secure mobile encrypted platforms like the picture above. The systems provides for new features that include the ability to "add-on" to a legacy system as opposed to building a new system. The system can execute faster than current legacy systems due to automatic variable scalarization and loop unfolding techniques.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for extracting and translating code from a computer system to an external platform connectable thereto, said method comprising:
    extracting binary instructions from the computer system, the instructions including a function at a register location;
    disassembling said binary instructions to produce an intermediate representation of said function in symbolic characters;
    parsing said intermediate representation by syntax to segregate instruction code from data as a parsed representation;
    providing an interruption at said location;
    linking said interruption to a routine call for said function;
    analyzing said parsed representation for data dependency to identify internal data references for said routine call and external data references for said function to produce a data dependence representation;
    reconfiguring said data dependence representation to resolve any discrepancy between said internal and external data references to produce a reconfigured representation, further incorporating on the external platform:
        a library that said function calls with said external data references, and
        a protocol interface that routes said routine call from said interruption with said internal data representation that includes input to said function with said external data representation that includes output;
    analyzing said reconfigured representation for control flow logic to produce a logic hierarchy representation for said function;
    translating said logic hierarchy representation to produce a source code;
    replacing said function at said location with obfuscation code;
    compiling said source code on the external platform to produce object code; and
    linking said object code with the binary instructions upon execution.

2. The method according to claim 1, wherein analyzing said reconfigured representation further comprises:
    optimizing said reconfigured representation to reduce computation load; and
    inserting a register association between each internal data reference for said routine call and each external data reference for said function.

3. The method according to claim 1, wherein the intermediate representation is written as data within internal data structures.

4. A method for translating instructions to a platform, said instructions including a function at a register location and having been extracted from a computer system and disassembled to produce an intermediate representation of said function in symbolic characters, said method comprising:
    parsing the intermediate representation by syntax to segregate instruction code from data as a parsed representation;
    providing an interruption at the location;
    linking said interruption to a routine call for the function;
    analyzing said parsed representation for data dependency to identify internal data references for said routine call and external data references for the function to produce a data dependence representation;
    reconfiguring said data dependence representation to resolve any discrepancy between said internal and external data references to produce a reconfigured representation, further incorporating on the external platform:
        a library that said function calls with said external data references, and
        a protocol interface that routes said routine call from said interruption with said internal data representation that includes input to said function with said external data representation that includes output;
    analyzing said reconfigured representation for control flow logic to produce a logic hierarchy representation for said function;
    translating said logic hierarchy representation to produce a source code;
    replacing said function at said location with obfuscation code;
    compiling said source code on the external platform to produce object code; and
    linking said object code with the binary instructions upon execution.

5. The method according to claim 4, wherein analyzing said reconfigured representation further comprises:
    optimizing said reconfigured representation to reduce computation load; and
    inserting a register association between each internal data reference for said routine call and each external data reference for said function.

6. The method according to claim 4, wherein the intermediate representation is written as data within internal data structures.

* * * * *